United States Patent [19]

Kawamura et al.

[11] Patent Number: 4,821,201
[45] Date of Patent: Apr. 11, 1989

[54] METHOD OF REVISING NC PROGRAM FOR FOUR-AXIS LATHES

[75] Inventors: Hideaki Kawamura; Takao Sasaki; Teruyuki Matsumura, all of Tokyo, Japan

[73] Assignee: Fanuc Ltd, Minamitsuru, Japan

[21] Appl. No.: 103,581

[22] PCT Filed: Dec. 10, 1986

[86] PCT No.: PCT/JP86/00624

§ 371 Date: Aug. 3, 1987

§ 102(e) Date: Aug. 3, 1987

[87] PCT Pub. No.: WO87/03524

PCT Pub. Date: Jun. 18, 1987

[30] Foreign Application Priority Data

Dec. 10, 1985 [JP] Japan .................. 60-277746

[51] Int. Cl.$^4$ .................. G06F 15/46; G05B 19/42
[52] U.S. Cl. .................. 364/474.2; 364/192; 364/474.31
[58] Field of Search ............. 364/192, 474, 475, 513, 364/167; 901/6

[56] References Cited

U.S. PATENT DOCUMENTS

| | | | |
|---|---|---|---|
| 4,497,028 | 1/1985 | Nozawa et al. | 364/474 |
| 4,590,572 | 5/1986 | Imanishi | 364/474 |
| 4,680,719 | 7/1987 | Kishi et al. | 364/474 |
| 4,700,313 | 10/1987 | Takagawa | 364/474 |
| 4,720,796 | 1/1988 | Kishi et al. | 364/474 |

Primary Examiner—Jerry Smith
Assistant Examiner—Paul Gordon
Attorney, Agent, or Firm—Staas & Halsey

[57] ABSTRACT

In checking tool rests for interference, interpolative simulations are executed by interpolation simulators (103, 104) one block at a time in successive fashion based on first and second NC programs (101, 102). In a case where the tool rests interfere with each other, the interpolative simulations are halted and both tool rests are moved backward to the beginning of the blocks in which the interference occurred. Thereafter, with the interpolative simulation based on one NC program being kept in the halted state, the interpolative simulation based on the other NC program is executed to move the other tool rest separately along a path in the interfering block. If interference does not occur during this separate movement, sequence numbers N, M of the firt and second NC programs in the blocks in which the interference occurred are stored in a storage area (301a). Thereafter, a similar interference check is performed. After the interference check, the first and second NC programs 101, 201 are revised by inserting a wait command ahead of the block of sequence number M in the NC program for which the interpolative simulation was halted, and inserting a wait command after the block of sequence number N in the NC program for which the interpolative simulation was executed.

8 Claims, 5 Drawing Sheets

4,821,201

METHOD OF REVISING NC PROGRAM FOR FOUR-AXIS LATHES

BACKGROUND OF THE INVENTION

1. Technical Field

This invention relates to a method of revising NC programs for a four-axis lathe having two tool rests. More particularly, the invention relates to an NC program revision method in which, if the tool rests are going to interfere with each other, the NC programs are revised in such a manner that the interference will not occur.

2. Background Art

An NC four-axis lathe is provided with first and second NC programs having wait commands corresponding to respective ones of first and second tool rests. While synchronization is achieved by the wait commands, movement of the corresponding tool rests is controlled independently by the first and second NC programs to subject a workpiece to machining.

FIG. 5 shows an example of first and second NC programs 1, 2 in an NC four-axis lathe. The programs respectively include program numbers 1a, 2a, program portions 1b, 2b for executing a first machining operation, first wait commands 1c, 2c, program portions 1d, 2d for executing a second machining operation, second wait commands 1e, 2e, program portions 1f, 2f for executing a third machining operation, third wait commands 1g, 2g, program portions 1h, 2h for executing a fourth machining operation, fourth wait commands 1i, 2i, program portions 1j, 2j for executing a fifth machining operation, and tape end commands 1k, 2k.

In accordance with the first and second NC programs 1, 2, the first and second tool rests machine a workpiece simultaneously (simultaneous independent operation) according to the program portions 1b, 2b, and, in response to the first wait command "M100", the tool rest which finishes the machining operation first waits until the other NC controller reads in the first wait command "M100".

When the other NC controller reads in "M100", the simultaneous independent operation is performed according to the program portions 1d, 2d. In response to the second wait command "M200", the tool rest which finishes the machining operation first waits until the other NC controller reads in the second wait command "M200".

When the other NC controller reads in "M200", the simultaneous independent operation is performed according to the program portions 1f, 2f. Note that since the program portion 1f is blank, the first tool rest immediately assumes a waiting state in response to the third wait command "M300", and only the second tool rest performs machining according to the program portion 2f.

When machining by the second tool rest ends and the third wait command "M300" is read in, the simultaneous independent operation starts in accordance with the program portions 1h, 2h. Thereafter, this four-axis lathe control is performed in a similar manner, with simultaneous four-axis machining being ended in response to the tape end commands M30.

Thus, with a four-axis lathe having two tool rests, the tool rests can be controlled and moved independently. Such a lathe is advantageous in that e.g. the outer diameter of a workpiece 13 (see FIG. 6) can be cut by a tool 12 mounted on one tool rest 11 and the inner diameter of the workpiece can be cut by a tool 22 mounted on the other tool rest 21. This enables machining time to be curtailed.

However, in a case where the two tool rests 11, 21 carry out machining simultaneously, a situation can arise, due to a program command error, in which the two tool rests (inclusive of their tools) collide. Since such a collision must be avoided at all costs, the conventional practice is to check prior to actual machining whether or not the two tool rests will collide (this is referred to as an "interference check"), and revising the first and second NC programs corresponding to the tool rests if a collision occurs.

The interference check for determining whether the two tool rests will coolide is performed as follows in the prior art:

As shown by the dashed lines in FIGS. 7(A) and 7(B) the shapes of the tools 12, 22 and tool rests 11, 21 are defined (approximated) as rectangular regions, whether these two rectangles will overlap is checked, and it is deemed that interference will take place if overlapping occurs. This operation is performed with regard to all tools mounted on the tool rests. The only reason for thus defining the shapes as rectangles is that checking for the overlapping of rectangles involves comparatively simple calculations. Preferably, figures conforming to the actual shapes should be checked for overlapping, but this is not realistic due to the complicated calculations involved. Recently, however, it has become possible to input a figure conforming to actual shape into an NC unit with regard to every tool, and to check thee figures for overlapping. In other words, since a CRT capable of displaying color graphics may now be installed in an NC unit, each tool is displayed in a separate color and an interference check can readily be formed based on whether or not the two color displays overlap.

If tool interference is going to occur, the NC programs must be revised in such a manner that the interference will not be allowed to happen. In the prior art, however, an NC program cannot be revised automatically. As a result, the revision operation is a troublesome one and requires an extended period of time.

SUMMARY OF THE INVENTION

Accordingly, an object of the present invention is to provide an NC program revision method through which NC programs for a four-axis lathe can be revised automatically in such a manner that interference will not occur.

Revision of NC programs for a four-axis lathe according to the present invention is performed in the following manner: In an interference check, interpolative simulations are executed one block at a time in successive fashion based on first and second NC programs. If interference occurs, the interpolative simulations are halted and both tool rests are moved backward to the beginning of the blocks in which the interference occurred.

Thereafter, with the interpolative simulation based on one NC program being kept in the halted state, the interpolative simulation based on the other NC program is executed to move the other tool rest separately along a path in the interfering block. If interference does not occur during this separate movement, sequence numbers N, M of the first and second NC programs in the aforementioned blocks in which the interference occurred are stored. Thereafter, and in a similar manner, the interpolative simulations are resumed based on the first and second NC programs.

After the interference check, the NC programs are revised by inserting a wait command ahead of the block of sequence number M in the NC program for which the interpolative simulation was halted, and inserting a wait command after the block of sequence number N in the NC program for which the interpolative simulation was executed.

DESCRIPTION OF THE PREFERRED EMBODIMENT

Figure 1:
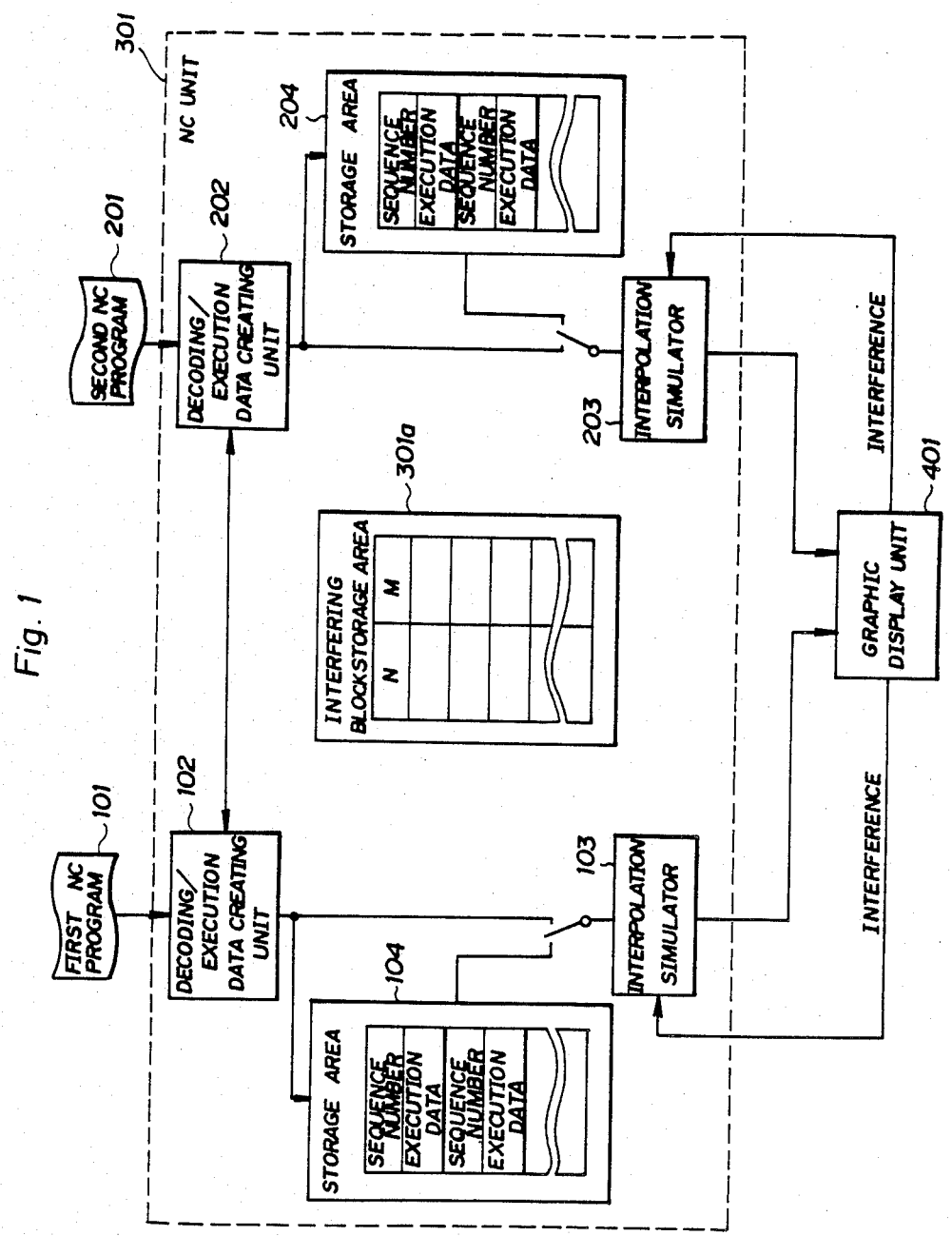
FIG. 1 is a functional block diagram of the present invention.

FIG. 1 is a bench diagram for describing the present invention. Numerals 101, 201 respectively denote first and second NC programs provided for corresponding first and second tool rests. Numeral 301 denotes a computerized NC unit, and number 401 represents a graphic display unit equipped with an interference check function.

Numerals 102, 202 denote decoding/execution data creation units for reading and decoding the NC programs one block at a time and for creating execution-format data. Numerals 103, 203 represent interpolation simulators, and numerals 104, 204 designate storage areas each of which stores the latest path data of a plurality of blocks along with the block numbers (sequence numbers). Numeral 301a denotes an interfering block storage area for storing the sequence numbers of interfering blocks. It should be noted that the elements numbered in the 100's are for controlling the movement of the first tool rest, and the elements numbered in the 200's are for controlling the movement of the second tool rest.

The graphic display unit 401 displays two tools in different colors so that overlapping of first and second tools may be distinguished. For example, if the first tool rest and its tool are painted on the display in blue and the second tool rest and its tool are painted in green, then overlapping of the two tools is deemed to occur when a "1" is read out of a frame memory (video RAM) for blue and a video RAM for green simultaneously.

Figure 2:
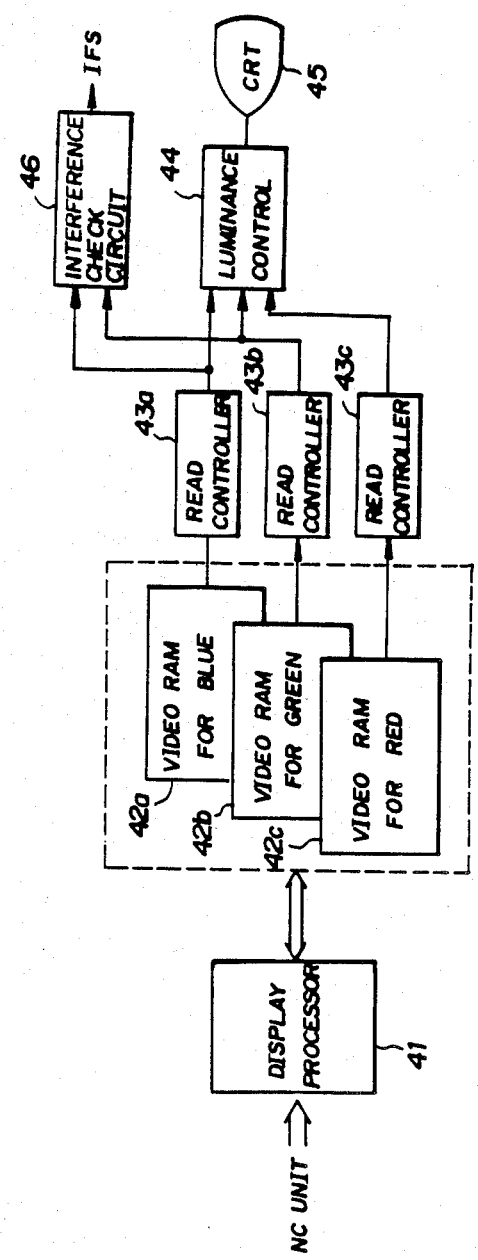
FIG. 2 is a block diagram of a graphic display unit for performing an interference check.

FIG. 2 is a block diagram of the graphic display unit 401. Numeral 41 denotes a display processor, 42a–42c represent RAMs for blue, green and red beams, respectively, numerals 43a–43c denote read controllers, 44 a luminance control circuit, 45 a CRT and 46 an interference check circuit.

When the display processor 41 receives an input of interpolation data from the NC unit, the stored positions of the first and second tool rests (the painted pictures thereof) in the video RAMs 42a, 42b are moved on the basis of the interpolation data. It should be noted that a picture of the stationary portion of the machinery is stored in the video RAM 42c. Meanwhile, the read controllers 43a–43c read the pictures out of the video RAMs 42a–42c and apply them to the luminance control circuit 44 in synchronism with the raster scanning of the CRT. On the basis of the picture data read out of the video RAMs, the luminance control circuit subjects the blue, green and red grids to luminance control and paints the pictures of the tool rests and the stationary portion of the machinery on the CRT 45.

In concurrence with the foregoing, the interference check circuit 46 checks whether "1" has been read out of the video RAMs 42a, 42b simultaneously. If this is the case, it is construed that the tool rests will interfere with each other; hence, an interference signal IFS is outputted by the interference check circuit.

Figure 3:
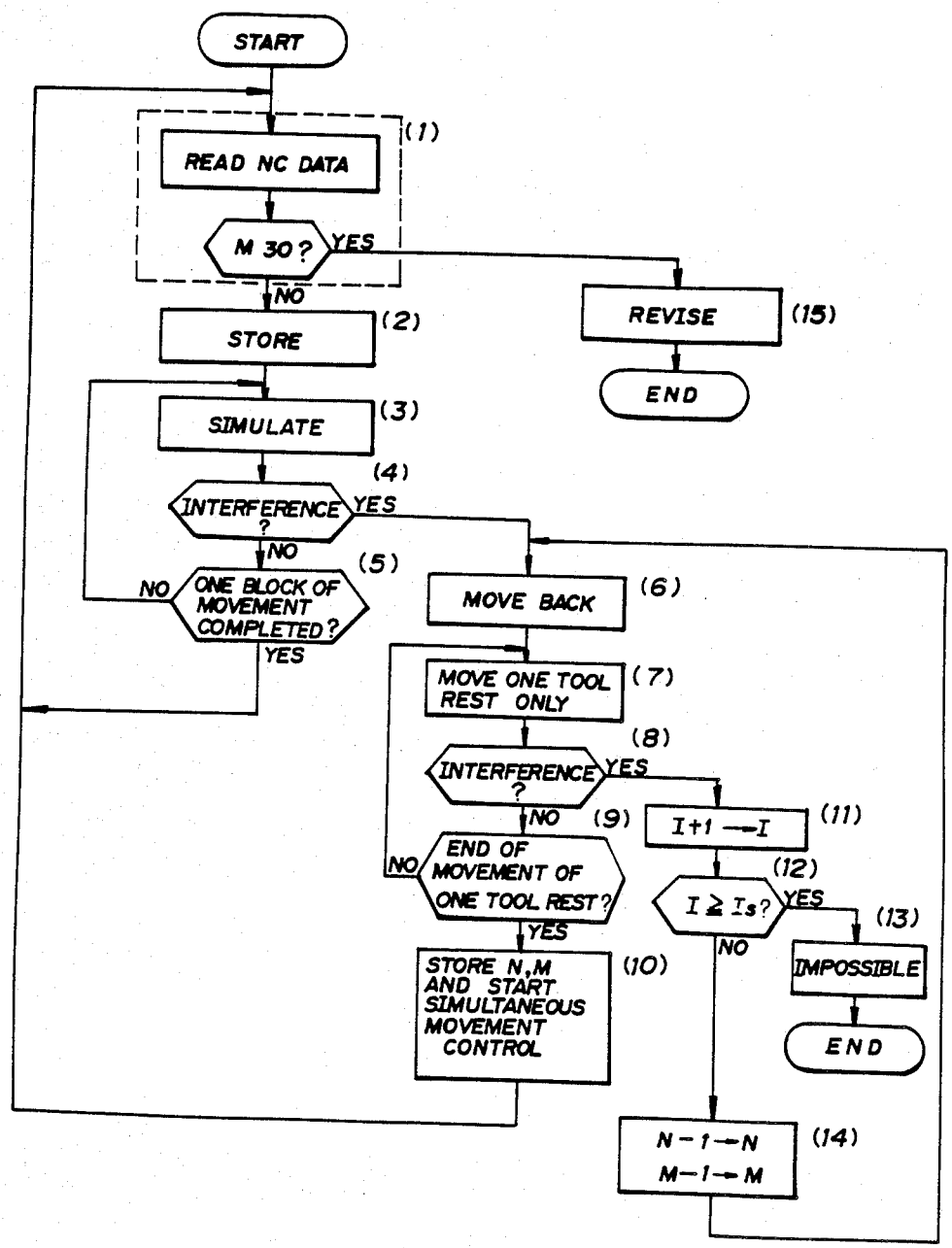
FIG. 3 is a flowchart of processing according to the invention.

FIG. 3 is a processing flowchart illustrating a method of revising NC programs for a four-axis lathe according to the present invention. The overall operation of FIG. 1 will now be described in accordance with this flowchart.

(1) When the interference check is started by operating a switch on an operator's panel (not shown), the NC programs of the respective tool rests are read, decoded and converted into execution-format data one block at a time by the decoding/execution data creating units 102, 202. In the interference check, the tool rests are mechanically locked so as not to move. The tools rests move only on the screen of the CRT.

If an item of NC data is indicative of program end M02 or tape end M30, the interference check processing is ended and revision processing, described below, is executed.

(2) The execution format data are stored in the storage areas 104, 204, which are referred to as a program data memory. Sequence numbers are also stored in these storage areas together with the execution format data.

(3) The interpolation simulators 103, 203 execute interpolative simulation using the execution format data, and the results are delivered to the graphic display unit 401.

(4) On the basis of the interpolated data, the graphic display unit 401 moves the stored positions of the tools in the video RAMs and displays this. In addition, the graphic display unit checks whether the two tools interfere with each other.

(5) If the tools do not interfere with each other, a check is performed to determine if one block of an interpolative simulation has ended. If it has not ended, processing is executed from step (3) onward; if it has, processing is repeated from step (1) onward based on the next block of NC data.

(6) If the tools interfere with each other in step (4), the interpolation simulators 103, 203 stop interpolating. Let N represent the sequence number of the first NC program at the moment of interference, and let M represent the sequence number of the second NC program at the moment of interference.

Thereafter, the two tool rests are moved backward to the starting positions of the interfering blocks using the respective tool positions that prevailed when interpolation was stopped and the starting positions of the interfering blocks (these positions having been stored in the storage areas 104, 204).

(7) When the backward movement is completed, only the interpolation simulator 103 (or the interpolation simulator 203) performs an interpolative simulation based on path data in the interfering block, whereby solely the the first tool rest is moved along the path of the interfering block.

(8) The graphic display unit 401 checks whether interference occurs with regard to this movement solely of the first tool rest.

(9) If interference does not occur, it is checked whether this sole movement along the path of the interfering block is completed. If the sole movement is not completed, processing is resumed from step (7) onward.

(10) If the movement solely of the first tool rest is completed without the occurrence of interference, then N, M are stored in the interfering block storage area 301a, after which simultaneous movement control is resumed. Note that the first tool rest is subjected to path control based on the next item of NC data, and that the second tool rest is subjected to path control based on the latest path data stored in the storage area 204.

(11) If interference occurs at step (8), then the operation I+1→I is performed (where I is the number of time interference occurs and is cleared to zero by a wait command).

(12) A check is performed to determine whether $I \geq I_s$ holds, where $I_s$ represents the number of times interference is allowed to occur from one wait command to the next.

(13) If $I \geq I_s$ holds, control of the four-axis lathe by the first and second NC programs is construed to be unsuitable, a display is made to this effect and processing is ended.

(14) If $I < I_s$ holds, the operations N−1→N, M−1→M are performed, whereby the blocks that are one block before the blocks in which the interference actually occurred are regarded as the interfering blocks. This is followed by repeating processing from block (6) onward.

When the interference check is thus completed, processing for revising the first and second NC programs is executed using the sequence numbers stored in the interfering block storage area 301a. Specifically, the NC programs are revised by:

(a) inserting a wait command ahead of the block whose sequence number is M in the second NC program for which interpolative simulation was stopped.

(b) inserting a wait command after the block whose sequence number is N in the NC program for which interpolative simulation was executed.

For example, assume that the first and second NC programs are as follows:

| First NC Program | Second NC Program |
| --- | --- |
| N1100M100; | N2100M100; |
| N1101G00X__Z__S__M03; | N2101G00X__Z__; |
| N1102G01X__F__; | N2102G01Z__F__; |
| N1103G00Z__; | N2103G00X__; |
| N1104X__; | N2104Z__; |
| N1105G01Z__; | N2105G01X__; |
| N1106X__; | N2106Z__; |
| N1200M200; | N2200M200; |

Figure 4:
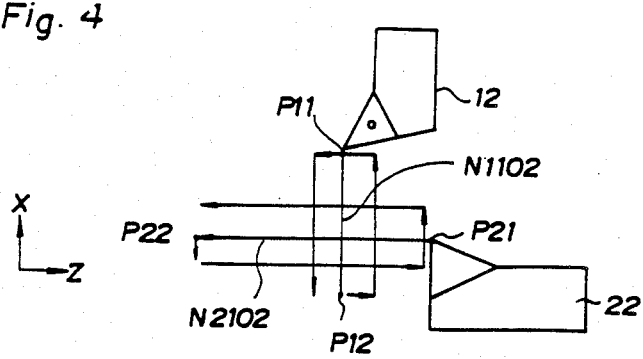
FIG. 4 is a diagram for describing program revision in case of interference.
Figure 6:
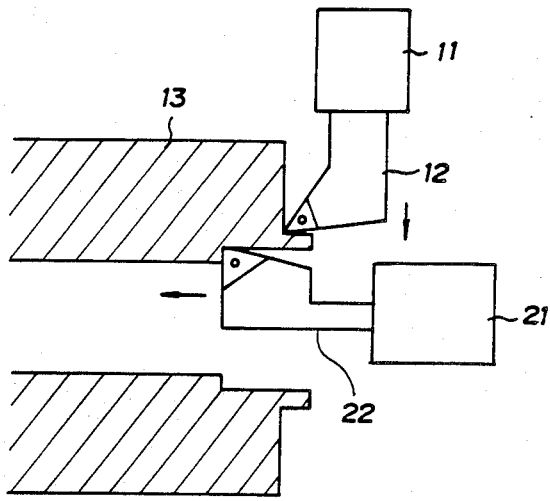
FIG. 6 is a diagram for describing a four-axis lathe.
Figure 7A:
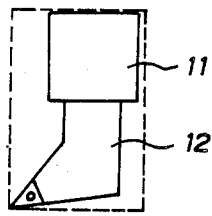
FIGS. 7(A) and 7(B) are diagrams for describing an interference check.
Figure 7B:
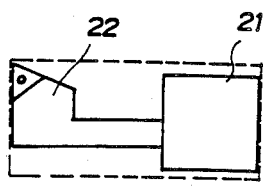
Figure 5:
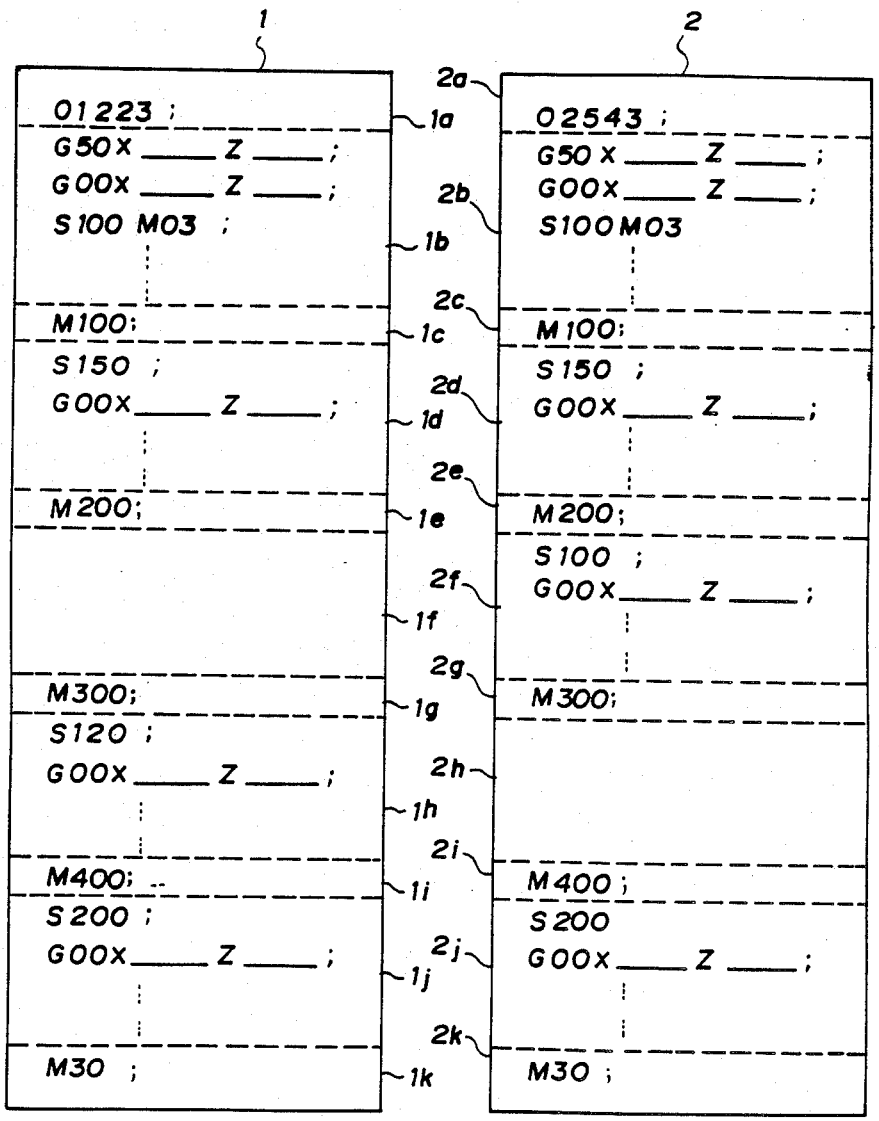
FIG. 5 is a diagram of an example of NC programs for a four-axis lathe.

(where M100, M200 are wait commands). Further, assume that interference occurs with regard to movement associated with sequence N1102 of the first NC program and sequence number N2102 of the second NC program, as shown in FIG. 4. In such case, N=1102, M=2102 (where it is assumed that interference does not occur when only one tool rest is moved), and the first and second NC programs are revised as follows:

| First NC Program | Second NC Program |
| --- | --- |
| N1100M100; | N2100M100; |
| N1101G00X__Z__S__M03; | N2101G00X__Z__; |
| N1102G01X__F__; | N2102M300; |
| N1103M300 | N2103G01Z__F__; |
| N1104G00Z__; | N2104G00X__; |
| N1105X__; | N2105Z__; |
| N1106G01Z__; | N2106G01X__; |
| N1107X__; | N2107Z__; |
| N1200M200; | N2200M200; |

In the foregoing case, sole movement of one tool rest upon completion of backward movement is performed by one of the NC programs decided in advance unconditionally. However, which of the interpolative simulations is to be executed can be decided upon taking into consideration the type of machining performed by the tool rests. For example, the NC program for which the interpolative simulation is halted may be decided upon considering a requirement that inner diameter cutting is to have priority over end face cutting and outer diameter cutting.

Thus, according to the invention, when it is found that interference will occur in a tool rest interference check, the NC programs for the four-axis lathe can be revised automatically in such a manner that the interference will not take place. This makes it possible to execute revision processing simply in a short period of time.

What is claimed is:

1. A method of revising NC programs for a four-axis lathe in which there are provided first and second NC programs corresponding to first and second tool rests, respectively, the first and second NC programs each having wait commands, wherein a workpiece is machined by controlling movement of the first and second tool rests independently in accordance with the first and second NC programs, respectively, while synchronization is achieved by the wait commands, said method comprising the steps of:

(a) executing interpolative simulations one block at a time in successive fashion based on the first and second NC programs when an interference check is made;

(b) checking whether tools on the first and second tool rests interfere with each other during said step (a);

(c) when it is determined in said step (b) that there is interference, halting the interpolative simulations and moving the two tool rests back to the beginning of blocks in which the interference occurred;

(d) holding the interpolative simulation according to one of the first and second NC programs in the halted state and executing the interpolative simulation according to the other of the first and second NC programs to move solely the corresponding tool rest along a path in the block in which the interference occurred while checking for interference;

(e) when no interference is found when moving solely the one tool rest in said step (d), storing sequence numbers of the first and second programs which prevailed when interference occurred; and (f) automatically revising the NC programs after the interference check by inserting a wait command ahead of the sequence number of the NC program for which the interpolative simulation was halted in said step (d), and inserting a wait command after the sequence number of the NC program for which the interpolative simulation was executed in said step (d).

2. A method of revising NC programs for a four-axis lathe according to claim 1, further comprising the step of inputting interpolation data obtained by the interpolative simulations to a graphic display unit, wherein the graphic display unit performs the interference check of said step (b).

3. A method of revising NC programs for a four-axis lathe according to claim 2, wherein said step (b) includes displaying each of the tool rests based on picture data stored in separate video RAMs by reading the picture data out of both video RAMs in synchronism with raster scanning of a CRT, and rendering a decision to the effect that of the tool rests will interfere with each other when both items of the picture data attain a high level simultaneously.

4. A method of revising NC programs for a four-axis lathe according to claim 1, wherein said step (a) comprises storing several items of latest NC data in the first and second NC programs for which the interpolative simulations are executed in a memory, and wherein said step (c) comprises reading out starting positions of the blocks in which interference occurred from the memory and moving both of the tool rests back to the starting points of the blocks.

5. A method of revising NC programs for a four-axis lathe according to claim 1, further comprising a step (g) which is executed when interference occurs when moving solely one tool rest in said step (d), said step (g) comprising regarding blocks that are one block before the blocks in which the interference occurred as the interfering blocks, moving both tool rests to starting points of the blocks that are one block before the blocks in which the interference occurred, and thereafter controlling the movement solely of the one tool rest in accordance with said step (d).

6. A method of preventing interference between tools in an NC machine tool controlled by first and second NC programs which control the movement of first and second tool rests, respectively, to machine a workpiece, comprising the steps of:

(a) reading the first and second NC programs one block at a time in successive fashion and executing interpolative simulations on the first and second NC programs while displaying the first and second tool rests;

(b) determining whether the tools on the first and second tool rests interfere with each other during the interpolative simulations executed in said step (a);

(c) suspending execution of the interpolative simulations of said step (a) when it is determined in said step (b) that there is interference between the tools, and returning the displayed first and second tool rests to a position corresponding to the beginning of the blocks of the first and second programs in which interference occurred;

(d) executing interpolative simulation according to one of the first and second NC programs to move the display of the first tool rest in accordance with the corresponding block of the first NC program, while maintaining the interpolative simulation according to the second NC program in a suspended state;

(e) determining whether the tools on the first and second tool rests interfere with each other during said step (d);

(f) storing sequence numbers corresponding to the blocks of the first and second programs in which the interference occurred in said step (b) when it is determined that there is no interference in said step (e);

(g) returning to said step (a) after said step (f) has been completed; and (h) automatically revising the first and second NC programs after interpolative simulation has been executed for all of the first and second NC programs, by inserting a wait command in front and each block of the second NC program having a stored sequence number corresponding to the second NC program being suspended in said step (d), and inserting a wait command after each block of the first NC program corresponding to a stored sequence number for the first NC program for which interpolative simulation was executed in said step (d).

7. A method according to claim 6, wherein said step (a) includes displaying each of the first and second tool rests in different colors.

8. A method of revising NC programs for a four-axis lathe in which there are provided first and second NC programs corresponding to first and second tools rests, respectively, the first and second NC programs each having wait commands, wherein a workpiece is machined by controlling movement of the first and second tool rests independently in accordance with the first and second NC programs, respectively, while synchronization is achieved by the wait commands, said method comprising the steps of:

(a) executing interpolative simulations one block at a time in successive fashion based on the first and second NC programs when an interference check is made, said step (a) including storing several items of latest NC data in the first and second NC programs for which the interpolative simulations are executed in a memory;

(b) checking whether tools on the first and second tool rests interfere with each other during said step (a);

(c) when it is determined in said step (b) that there is interference, halting the interpolative simulations and moving the tool rests back to the beginning of blocks in which the interference occurred, said step (c) including reading out starting positions of the blocks in which interference occurred from the memory and moving both of the tool rests back to the starting points of the blocks;

(d) holding the interpolative simulation according to one of the first and second NC programs in the halted state and executing the interpolative simulation according to the other of the first and second NC programs to move solely the corresponding tool rest along a path in the block in which the interference occurred while checking for interference;

(e) when no interference is found when moving solely the one tool rest in said step (d), storing sequence numbers of the first and second programs which prevailed when interference occurred; and (f) revising the NC programs after the interference check by inserting a wait command ahead of the sequence number of the NC program for which the interpolative simulation was halted in said step (d), and inserting a wait command after the sequence number of the NC program for which the interpolative simulation was executed in said step (d).

* * * * *

UNITED STATES PATENT AND TRADEMARK OFFICE
CERTIFICATE OF CORRECTION

PATENT NO. : 4,821,201
DATED : APRIL 11, 1989
INVENTOR(S) : HIDEAKI KAWAMURA ET AL.

It is certified that error appears in the above-identified patent and that said Letters Patent is hereby corrected as shown below:

FRONT PAGE [57] ABSTRACT, line 15, "firt" should be --first--

Col. 2, line 32, "thee" should be --these--.

Col. 3, line 30, "bench" should be --block--.

Col. 5, line 65, after "sequence" insert --number--.

Col. 7, line 21, delete "of".

Col. 8, line 17, "and" should be --of--.

Signed and Sealed this

Twenty-fourth Day of October, 1989

Attest:

DONALD J. QUIGG

*Attesting Officer*          *Commissioner of Patents and Trademarks*